United States Patent [19]

Block et al.

[11] 4,424,302

[45] Jan. 3, 1984

[54] METHOD OF FORMING POLYMER PARTICLES

[75] Inventors: Jacob Block, Rockville, Md.; Alan S. Michaels, San Francisco, Calif.

[73] Assignee: W. R. Grace & Co., New York, N.Y.

[21] Appl. No.: 176,803

[22] Filed: Aug. 11, 1980

Related U.S. Application Data

[63] Continuation-in-part of Ser. No. 141,852, Apr. 21, 1980, abandoned, which is a continuation-in-part of Ser. No. 121,226, Feb. 13, 1980, abandoned.

[51] Int. Cl.$^3$ ............................................. C08J 3/24
[52] U.S. Cl. .................... 525/58; 252/8.5 C; 525/61; 536/88
[58] Field of Search ............ 252/8.5 A, 8.5 C, 8.55 R; 260/29.6 CM; 536/87, 88; 260/29.6 PM; 525/61, 58

[56] References Cited

U.S. PATENT DOCUMENTS

| | | | |
|---|---|---|---|
| 2,879,268 | 3/1959 | Jullander | 536/87 |
| 3,072,635 | 6/1963 | Menkart et al. | 536/87 X |
| 3,252,904 | 5/1966 | Carpenter | 252/8.55 |
| 3,461,115 | 8/1969 | Schwarzer | 536/87 |
| 3,727,688 | 4/1973 | Clampitt | 252/8.55 X |
| 3,727,689 | 4/1973 | Clampitt | 252/8.55 X |
| 3,909,423 | 9/1975 | Hessert et al. | 252/8.55 X |
| 4,272,470 | 6/1981 | Hsu et al. | 525/61 X |
| 4,309,535 | 1/1982 | Majewicz | 536/87 X |

FOREIGN PATENT DOCUMENTS 356408  9/1931  United Kingdom .................. 525/61

*Primary Examiner*—Herbert B. Guynn
*Attorney, Agent, or Firm*—Howard J. Troffkin

[57] ABSTRACT

A process for forming polymeric particles from water-soluble polymers by introducing the polymer into an aqueous salt solution in which the salt is of a composition and present in an amount sufficient to inhibit solubilization of the polymer therein and subsequently introducing into the aqueous medium a multifunctional reagent and mixing said aqueous medium for a time and at a temperature sufficient to cause reaction between the polymer and the reagent. The resultant solid polymer is readily recovered.

11 Claims, No Drawings

METHOD OF FORMING POLYMER PARTICLES

This is a co-pending, continuation-in-part application of U.S. Ser. No. 141,852 filed Apr. 21, 1980 which is a continuation-in-part application of U.S. Ser. No. 121,226, filed Feb. 13, 1980 both now abandoned.

BACKGROUND OF THE INVENTION

The present application relates to a process of forming polymeric particulate material. The resultant particles are readily swellable in aqueous systems and can be used as fluid loss control agents for drilling fluids and in gel permeation chromatography as well as other known and readily ascertainable purposes where discrete gel particles are used.

The formation of solid, particulate material from water-soluble polymers is conventionally done by emulsion polymerization using monomeric polymerizable compounds which are dispersed in an oil-water emulsion system in the presence of a polymerization catalyst. The resultant polymer is cross-linked by adding a suitable cross-linking agent. Such systems have the distinct disadvantages of requiring the use of organic solvents and surfactants which are expensive and require special handling and purging from the resultant polymer product.

Preformed water-soluble polymers can be conventionally cross-linked and formed into particulate matter by using an emulsion process in which the polymer is cross-linked in an oil-water emulsion with the aid of a water-soluble cross-linking agent. Again the process requires the use of large quantities of organic solvent and is limited to specific hydrophilic cross-linking agents.

Previously formed water-soluble polymers are also cross-linked in aqueous systems by subjecting the system to a high degree of agitation during the cross-linking reaction. This mechanical agitation requirement necessitates the use of a large amount of energy and special equipment and requires the cross-linked product to be insoluble in water. Further, it has been sometimes found that the resultant product is not easily recovered in the form of dry particulate matter.

It is the object of the present invention to provide a process for forming cross-linked polymeric particulate material in an aqueous medium and from a water-soluble polymer.

It is further the object of the present invention to form a polymeric product which can subsequently form discrete gelled particles when reconstituted with water.

It is further the object of the present invention to produce a cross-linked polymeric particulate material from a water-soluble polymer.

It is further the object of the present invention to produce a cross-linked polymeric particulate material having a high cross-link density in the region of the exterior of the particle and low cross-link density in the region of the interior of the particle.

SUMMARY OF THE INVENTION

The present invention is directed to a process of forming a cross-linked polymeric material of particulate configuration by introducing a water-soluble polymer into an aqueous salt solution in which the salt is of a composition and present in an amount to inhibit solubilization of the polymer and subsequently introducing a polyfunctional reagent which is capable of reacting with at least two reactive sites contained in the polymer. The aqueous system is mixed at a temperature and for a time sufficient to cause the reagent and polymer to react. The polymer product is readily recoverable from the aqueous system.

DETAILED DESCRIPTION OF THE INVENTION

The subject process is capable of forming discrete polymer particles without the undesired need for using organic solvents and/or high degrees of mechanical energy.

The subject process is directed to forming discrete polymer particles from water-soluble polymeric material by reacting the subject polymer in an aqueous salt solution as fully described herein below.

Polymeric materials which contain aldehyde, hydroxyl, carboxyl, amino, imino, amido, sulfonyl groups or mixtures thereof and the like which impart water solubility to the polymer are processable by the subject invention. Examples of such polymeric materials are aldehyde containing polymers, such as polyacrolein and the like; hydroxy containing polymers such as polyvinyl alcohol, hydroxyalkyl cellulose, carboxyalkyl hydroxyalkyl cellulose, and the like; carboxy containing polymers such as polyacrylic acid, poly($C_1$–$C_3$ alk)acrylic acid, carboxyalkyl cellulose, olefin-maleic acid copolymers and their salts and the like; amino containing polymers such as polyethyleneimine, polyvinyl amine, polyvinylpyrrolidone and the like; amido containing polymers such as polyacrylamide and the like; sulfonate containing polymers such as sulfonated polystyrene, sulfonated melamine-formaldehyde condensates, sulfonated urea-formaldehyde condensates and the like as well as copolymers having monomeric units which contain water-solubilizing groups such as aldehyde, hydroxyl, carboxyl, amino, imino, amido, sulfonyl and the like in sufficient amount to impart water solubility. The subject, water-soluble polymer must also be capable of being inhibited from solubilizing in water by the presence of an inorganic water-soluble salt. The polymeric groups which impart water-solubility to the polymer are also suitable reactive groups to react with the polyfunctional agent described herein below.

The polyfunctional reagent suitable for use in the present invention are water soluble reagents which are substantially nonpolymeric. The reagent must be at least difunctional and reactive with the polymeric reactive group, e.g. aldehyde, hydroxyl, carboxyl, sulfoxyl amino, amido, imino and the like contained in the polymer being processed.

A suitable polyfunctional reactant to be used will depend on the chemical composition of the polymeric reactive groups as known and readily determined by those skilled in the art. For example, imino, amino or amido containing polymers can be reacted with aldehydes, such as formaldehyde, acetaldehyde and the like, polyaldehydes, such as trioxane, glyoxal, paraformaldehyde and the like; di or polycarboxylic acids such as malonic acid, oxalic acid and the like, epihalohydrins such as epichlorohydrin and the like, dihaloalkanes such as dichloroethane and the like, methylol and alkoxymethyl substituted ureas and melamines and polyisocyanates such as hexamethylene diisocyanate, toluene diisocyanate and the like. Carboxy containing polymers can be reacted with polyfunctional reactants which are, for example, di or polyalcohols such as ethylene glycol and the like, di and polyamines such as ethylenediamine, diethylenetriamine and the like. Polyhydroxy containing polymers can be reacted with aldehydes or polyaldehydes or polyacids such as discussed above with respect to the imino, amino or amido containing polymers.

The polymer is introduced into an aqueous solution which contains a water-soluble inorganic salt capable of inhibiting the solubilization of the polymer therein. It is well known that certain salts cause a particular polymer to become insoluble in aqueous solutions. Such salts have been used to precipitate or "salt out" soluble polymers formed from monomers by solution polymerization. The particular salt will depend upon the particular polymer being utilized. Suitable salt for a particular polymer can be readily ascertained by conventional methods. It is further realized that any particular salt has a threshold concentration which must be surpassed to impart the desired inhibiting of solubility. Such threshold concentration will be different for different polymer-salt combinations. Aqueous systems having from about 1 percent to saturation concentrations of a suitable water-soluble inhibiting salt are generally satisfactory for use in the present process. It is preferred that the salt concentration required to inhibit solubilization of a polymer be low, such as from about 1 to 20 percent based on the weight of water present. The inhibitory effect can be measured at ambient temperatures but preferably at reaction temperature.

The amount of polyfunctional reagent to polymer will depend upon the degree of cross-linking desired, the number of reactive groups contained in the polymer (normally this parameter is in excess), the reactivity of the polyfunctional reactant to the reactive groups of the polymer and the degree of functionality of the reagent. Generally, the reagent can be present in from 1 to 200 percent of stoichiometry of the polymer reactive groups.

The polyfunctional reagent capable of reacting with the reactive groups of the polymer is preferably added after introduction of the polymer to the aqueous medium.

The present process is carried out at a temperature and for a time which is sufficient to cause the polyfunctional reagent to react with the reactive groups of the polymer. Temperatures of from ambient temperature to about 100° C. and preferably from about 30° C. to 80° C. are normally satisfactory to cause the reaction to proceed at a desired rate. Temperatures above 100° C. can be used although it may require utilization of pressurized reaction vessels. The particular temperature utilized will depend on the reactivity of both the polyfunctional reagent and of the polymer reactive groups as are known or can be ascertained by conventional means. In certain instances a particular minimum elevated temperature should be used to cause the polyfunctional reagent to be formed into an active constituent such as, for example, in the case of paraformaldehyde which is required to depolymerize. The reaction should be carried out for a time sufficient to permit the reaction to proceed to the degree desired. Normally, reaction periods of from about 5 minutes to 5 hours, and preferably from about 15 minutes to 1 hour are sufficient.

Although the following theory is not meant to be a limitation on the subject invention, it is believed that the present process forms a unique polymer product by causing the initial, water-soluble polymer introduced in the aqueous system of the subject process to form micellar structures therein. These polymer micelles react with the multifunctional reactant primarily at the water-polymer interphase to form a polymer particle structure having a higher density of reacted sites at the exterior of the particle which encapsulates a less reacted polymer region.

The degree of cross-linking can be readily adjusted to form a polymeric product which can be readily separated from the aqueous system, dried and subsequently reconstituted in water to form discrete swelled particles.

The resultant product formed according to the subject process is free of organic solvent and surfactant contaminants such as are generally found in similar products formed by conventional emulsion polymerization processes.

Further description of the subject invention shall be made with respect to forming particulate cross-linked polyvinyl alcohol in an aqueous medium. It is understood that other water-soluble polymers can be processed in similar manners.

The polyvinyl alcohol reaction product formed according to the subject invention is made by contacting polyvinyl alcohol and an aldehyde containing or generating compound in the subject aqueous salt solution. The polyvinyl alcohols found useful in forming the subject reaction product have a weight average molecular weight of at least about 20,000 and preferably the weight average molecular weight should be from about 90,000 to 200,000. Conventionally polyvinyl alcohol is the hydrolyzed product of polyvinyl acetate. The hydrolysis should be at least about 75 percent complete to form a polyvinyl alcohol reactant which is substantially water-soluble. Suitable aldehyde containing reactants include, for example, formaldehyde, acetaldehyde, or polyaldehydes such as trioxane, glyoxal, paraformaldehyde and the like. Other suitable aldehyde reactants include aldehyde generating agents such as melamine-formaldehyde monomeric products and derivatives such as tri and hexa(methylol) melamine and the tri and hexa($C_1$–$C_3$ alkoxymethyl) melamine. Such materials can be formed by known conventional methods. The alkyl blocked derivatives are commercially available, are stable to self-polymerization and are, therefore, preferred. Of all of the aldehyde reactants, the preferred reactants are paraformaldehyde and formaldehyde.

The polyvinyl alcohol reaction product is formed by reacting a polyvinyl alcohol, as described above, with from at least about 1 and preferably from about 5 to 200 and more preferably from about 5 to 150 percent of stoichiometry of an aldehyde reactant based on the hydroxyl content of the polyvinyl alcohol. We define stoichiometry as the reaction of 2 OH groups with one aldehyde group to form an acetal. Excess aldehyde can be used. As described herein above the polyvinyl alcohol reaction product can be formed with an amount of polyfunctional reactant to cause the product to be capable of forming discrete swelled particles when reconstituted in water. Normally the amount of aldehyde reactant suitable for this is from 5 to 50 percent of stoichiometry.

The reaction between polyvinyl alcohol and an aldehyde containing or generating agent is catalyzed by acid and is, therefore, carried out at a pH of 5.5 or less and preferably from 1 to 4.5 which can be accomplished by the addition of an inorganic acid such as sulfuric, nitric, phosphoric or hydrochloric acid or the like to the aqueous medium.

The aqueous medium also contains an alkali metal sulfate in from 1 percent to saturation based on the weight of the water. It is preferred that the alkali metal sulfate be used in amounts of at least about 6 percent by weight. In lieu of the alkali metal sulfate, the aqueous medium can contain other salts known to inhibit solubilization of hydroxy containing polymers. Preferred minimum amounts of such salts are, for example, 6 percent ammonium sulfate, 4 percent sodium carbonate, 9 percent sodium phosphate dodecahydrate, 8 percent zinc sulfate heptahydrate, 8 percent sodium hypophosphate dodecahydrate, or 23 percent sodium nitrate.

The aqueous salt medium containing the polyvinyl alcohol and polyfunctional reagent in the form of an aldehyde, such as paraformaldehyde or formaldehyde, is mixed at a temperature and for a time to cause reaction between them. The reaction is carried out either at ambient or elevated temperatures, such as from about 50° C. to 100° C. At the elevated temperature the reaction can be carried out in from 0.25 to 1.5 hours. The resultant product is readily recovered by conventional techniques of decantation, filtration and drying.

The following examples are given for illustrative purposes only, and are not meant to be a limitation on the subject invention except as indicated by the appended claims. All parts and percentages are by weight unless otherwise indicated.

EXAMPLE I

An aqueous 6 percent sodium sulfate solution was prepared from commercially available salt and deionized water. 16.7 parts of commercially obtained polyvinyl alcohol having a weight average molecular weight of about 125,000 and about 87 percent hydrolyzed (Gelvatol 20-90) was introduced into 83.3 parts of the aqueous salt solution. The pH of the system was adjusted to 5.0 with dilute hydrochloric acid. 3 parts of paraformaldehyde (50 percent of stoichiometry) were added to the system which was then heated to 60° C. with stirring and maintained at that temperature for 30 minutes. The solution was allowed to cool. The polymer product was readily filtered and air dried at 50° C. for 16 hours. The dried prill product was redispersed in water to form an aqueous system having 5.6 percent polymer therein. This material was used as a drilling fluid component in accordance with the teachings contained in co-pending application U.S. Ser. No. 141,852.

The procedure described in the above paragraph was repeated with the exceptions that the concentration of sodium sulfate was increased from 6 to 16 percent and the initial polyvinyl alcohol concentration was altered to 25 percent. The product was readily dried to a fluffy white powder which readily redispersed.

EXAMPLE II

An aqueous 16 percent sodium sulfate solution was formed using commercially obtained salt and deionized water. The solution was adjusted to a pH of 3.0 with sulfuric acid. 50 parts of the polyvinyl alcohol described in Example I above was added to 150 parts of this aqueous salt solution. 17 parts of paraformaldehyde was then added to the aqueous system and the system was heated to and maintained at 60° C. for a 30 minute period. The pH was then adjusted to 7-8 using 50 percent solution of sodium hydroxide. The product was readily filtered and then dried at 50° C. under vacuum for 16 hours. The resultant product is a dry powder which, when reconstituted with water, produced small discrete gel particles. The swollen gel particles had a mean particle size of 65 microns as determined by standard light scattering analysis.

EXAMPLE III

The process of Example II above was repeated except that 4.6 parts of 37 percent formaldehyde solution was used instead of paraformaldehyde. As in Example II, the product was a dry powder which produced small discrete gel particles having a mean particle size, as measured by standard light scattering analysis, of about 65 microns when reconstituted with water.

EXAMPLE IV

The process of Example II is repeated except that the paraformaldehyde was replaced with stoichiometric equivalent amounts of hexamethyoxymethyl melamine and of malonic acid. The products which are formed in each run are substantially the same as described in Example II above.

EXAMPLE V

The process of Example II above is repeated except that the sodium sulfate is replaced in separate runs by ammonium sulfate, sodium carbonate, sodium phosphate dodecahydrate, and potassium sulfate. The product is substantially the same as described in Example II.

EXAMPLE VI

For comparative purposes, a cross-linked polyvinyl alcohol formed in a conventional manner had distinctly different properties.

22.5 parts of commercial polyvinyl alcohol as described in Example I above was dissolved in 177.5 parts of water. The pH was adjusted to 3.0 with hydrochloric acid. 7.65 parts paraformaldehyde was then added to the solution. The solution was stirred, heated to 60° C. and maintained at that temperature for 30 minutes. The system was then cooled and the pH was adjusted to 8 with 50 percent sodium hydroxide. 33 parts of sodium sulfate was added with stirring to cause the polymer to precipitate. The product was filtered to produce a rubbery, tacky mass. The mass was dried at 50° C. under vacuum for 16 hours. The resultant product was found difficult to reconstitute in water.

While the invention has been described in connection with certain preferred embodiments, it is not intended to limit the invention to the particular forms set forth but, on the contrary, it is intended to cover such alternatives, modifications and equivalents as defined by the appended claims.

What is claimed is:

1. A process for forming cross-linked polymeric particles comprising
    forming an aqueous salt solution;
    introducing into said salt solution a water-soluble polyvinyl alcohol polymer, said solution containing salt of a composition and present in an amount sufficient to inhibit solubilization of the polymer in the aqueous salt solution;
    introducing a polyfunctional reagent capable of reacting with at least two hydroxy groups of said polymer: said reagent selected from the group consisting of aldehyde containing compounds, di- and polycarboxylic acids, methylol and alkoxymethyl substituted ureas, or methylol and alkoxymethyl substituted melamines;

mixing said aqueous solution at a temperature and for a time sufficient to cause said polyfunctional reagent to react with said polymeric hydroxyl groups; and recovering the polymeric product as a dry powder which is capable of forming discrete gelled particles when reconstituted with water.

2. The process of claim 1 wherein the polyfunctional reagent is selected from the group consisting of an aldehyde containing compound, a dicarboxylic acid or a polycarboxylic acid; and said salt is selected from the group consisting of an alkali metal, alkaline earth metal or ammonium sulfate, nitrate or phosphate.

3. The process of claim 1 wherein the polyfunctional reagent is the group consisting of formaldehyde, acetaldehyde, is selected from trioxane, glyoxal, paraformaldehyde, trimethylol melamine, hexamethylol melamine or tri($C_1$–$C_3$ alkoxymethyl) melamine.

4. The process of claim 1 wherein the polyvinyl alcohol has a weight average molecular weight of at least 20,000 and is at least about a 75 percent hydrolyzed product.

5. The process of claim 2 wherein the polyvinyl alcohol has a weight average molecular weight of at least 20,000 and is at least about a 75 percent hydrolyzed product.

6. The process of claim 3 wherein the polyvinyl alcohol has a weight average molecular weight of at least 20,000 and is at least about a 75 percent hydrolyzed product.

7. The process of claim 6 wherein the salt is an alkali metal sulfate.

8. The process of claim 6 wherein the salt is an alkali metal nitrate.

9. A cross-linked polymeric product formed by the process of claim 1.

10. A cross-linked polymeric product formed by the process of claim 7.

11. A cross-linked polymeric product formed by the process of claim 8.

* * * * *